(12) United States Patent
Lich et al.

(10) Patent No.: US 8,185,273 B2
(45) Date of Patent: May 22, 2012

(54) DEVICE AND METHOD FOR DEACTIVATING SAFETY FUNCTION

(75) Inventors: Thomas Lich, Schwaikheim (DE);
Frank Ewerhart, Weinsberg (DE);
Reiner Marchthaler, Gingen (DE);
Stephan Stabrey, Stuttgart (DE);
Andreas Georgi, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 591 days.

(21) Appl. No.: 12/295,940

(22) PCT Filed: Mar. 23, 2007

(86) PCT No.: PCT/EP2007/052789
§ 371 (c)(1),
(2), (4) Date: Apr. 15, 2009

(87) PCT Pub. No.: WO2007/115923
PCT Pub. Date: Oct. 18, 2007

(65) Prior Publication Data
US 2009/0204296 A1    Aug. 13, 2009

(30) Foreign Application Priority Data

Apr. 3, 2006    (DE) .......................... 10 2006 015 489
Aug. 3, 2006    (DE) .......................... 10 2006 036 218

(51) Int. Cl.
*G05D 3/00* (2006.01)
(52) U.S. Cl. ........................... 701/45; 180/274; 180/282
(58) Field of Classification Search .................. 701/45; 180/274, 282
See application file for complete search history.

(56) References Cited

U.S. PATENT DOCUMENTS

| | | | |
|---|---|---|---|
| 6,742,850 B1 | 6/2004 | Eckert et al. | |
| 2005/0143890 A1 | 6/2005 | Minowa et al. | |

FOREIGN PATENT DOCUMENTS

| | | |
|---|---|---|
| DE | 101 35 742 | 2/2003 |
| DE | 10 2004 022894 | 12/2005 |
| EP | 1 609 656 | 12/2005 |
| JP | 2004-26145 | 1/2004 |
| JP | 2004-314848 | 11/2004 |
| WO | 2005/061264 | 7/2005 |

OTHER PUBLICATIONS

International Search Report, PCT/EP2007/052789, dated Jun. 13, 2007.

*Primary Examiner* — Eric Culbreth
(74) *Attorney, Agent, or Firm* — Kenyon & Kenyon LLP

(57) ABSTRACT

In a method for deactivating a safety function in a motor vehicle after being activated, the safety function may be deactivated by the driver only after a dead time has elapsed.

16 Claims, 1 Drawing Sheet

DEVICE AND METHOD FOR DEACTIVATING SAFETY FUNCTION

FIELD OF THE INVENTION

The present invention relates to a method and device for deactivating a safety function.

BACKGROUND INFORMATION

Today, a plurality of assistance and safety systems help drivers manage the task of driving. These include systems such as ABS and ESP, ACC, airbags and other restraint systems. Today, assistance systems are designed in such a manner that the driver maintains full control over the vehicle at all times. For example, this is achieved in that the driver deactivates the system in question by intervening personally. Thus, for example, an ACC is switched off as soon as the driver brakes or activates the gas pedal.

In the future, systems based on environment sensor systems, such as the automatic emergency braking, will also find their way into vehicles. Today, these systems are designed such that they trigger only when an accident is unavoidable. Thus, it is not necessary for them to be able to be overruled.

If safety systems are to intervene to avoid accidents, it is necessary for them to be able to be overruled in order to give the driver the opportunity to defuse dangerous situations through personal action.

SUMMARY

Example embodiments of the present invention provide a method for deactivating a safety function in a motor vehicle. An aspect hereof is that after being activated, the safety function may be deactivated by the driver only after a dead time has elapsed. Thus, a situation is avoided in which an imprudent panic reaction or overreaction of the driver leads to a deactivation of the safety function.

An aspect of example embodiments of the present invention is characterized by the fact that the temporal length of the dead time is a function of the situation.

An aspect of example embodiments of the present invention is characterized by the fact that the safety function is the driver-independent triggering of a braking action after a collision has been detected. The conscious deactivation of the braking gives the driver the opportunity to remove the vehicle from the vicinity of the accident again.

An aspect of example embodiments of the present invention is characterized by the fact that the temporal length of the dead time is a function of a variable that indicates the intensity of the detected collision.

An aspect of example embodiments of the present invention is characterized by the fact that at least one force acting on the driver is ascertained and the temporal length of the dead time is a function of this force that acts on the driver.

An aspect of example embodiments of the present invention is characterized by the fact that the safety function is the driver-independent triggering of a braking action after an imminent risk of a collision has been detected.

An aspect of example embodiments of the present invention is characterized by the fact that the imminent risk of a collision is detected on the basis of monitored environment-sensor-system signals.

Furthermore, example embodiments of the present invention provide a device having a device for implementing the methods.

DETAILED DESCRIPTION

Current safety systems are frequently not able to be overruled. It is an aspect of example embodiments of the present invention to allow a safety system to be overruled by the driver. Conventional strategies for deactivating vehicle systems such as ACC address "normal" driving situations in which corresponding driver-related operating variables are to be expected. However, if a safety function that intervenes in an emergency situation is to be examined, other responses on the part of the driver must be expected. In particular, in the event of a suddenly occurring emergency situation, a startle reaction on the part of the driver may be assumed. Possible manners of responding include no reaction at all to the event, delayed reaction to the event, or overreaction, for example.

For this reason, driver-related operating variables that occur during this startle reaction do not necessarily correspond with a targeted driver reaction and therefore may be interpreted only with difficulty or may not be interpreted at all with regard to a desire to overrule.

An aspect of example embodiments of the present invention is to terminate an intervention by a safety system only when the operating variables specified by the driver may be interpreted with regard to a desired overruling of the function.

After detecting a light collision, for instance, a safety function triggers a full braking operation so as to reduce the severity of an imminent subsequent collision. However, the braking operation may also be triggered on the basis of an environment sensor system for avoiding accidents.

The deactivation strategy terminates the automatically triggered braking only when the operating variables specified by the driver may be interpreted with regard to a desired overruling. This is the case at the earliest after the duration of the startle reaction has elapsed.

Thus, the method deactivates a safety function only if the driver-related operating variables have characteristic features of a desire to overrule (e.g. exceeding a threshold value) after the duration of an assumed, situation-dependent startle reaction has elapsed.

For a safety system that takes effect after a vehicle collision, the assumed duration of the startle reaction may be ascertained with the aid of the severity of the collision, for example.

In this context, the assumed duration of the startle reaction does not necessarily include only the psychological aspects of the driver's response. Physical conditions, such as forces acting on the driver, may also be considered. Thus, for example, in the event of a severe collision, it is to be assumed that a displacement of the passengers due to the accelerations in effect prevents the driver from operating the vehicle in the accustomed manner. In this case, the operating variables may not indicate a desire to overrule on the part of the driver.

Figure 2:
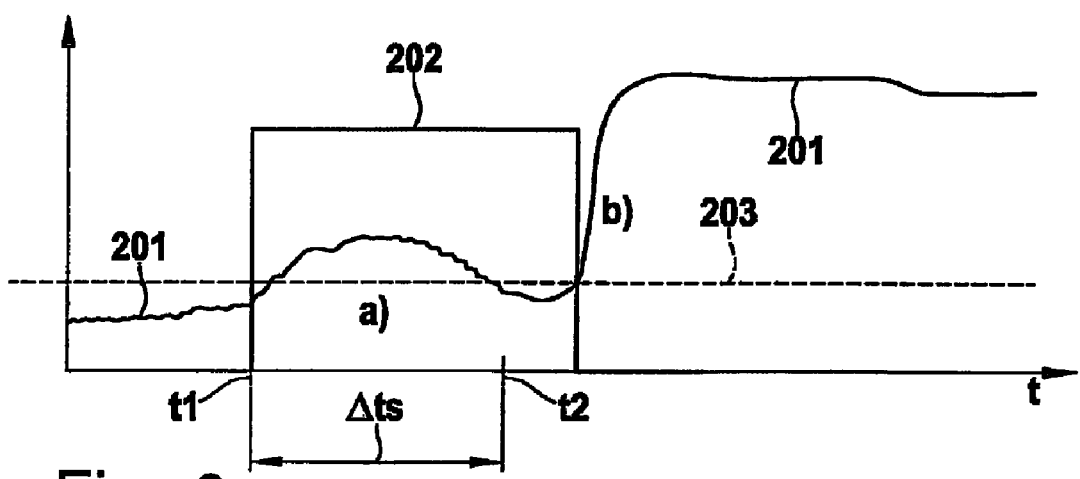
FIG. 2 shows a graph illustrating the degree of the activation of the gas pedal, the intensity of a brake intervention of the safety function, and a threshold value for the degree of the activation of the gas pedal over time.

In FIG. 2, this is the case in region a): the automatic braking after the event occurring at time t1 leads to the driver being displaced in a forward direction, and thus the foot located on the gas pedal causes an increased activation of the pedal (see curve 201). Only after expected duration $\Delta t_s$ of the startle reaction has elapsed is the exceeding of threshold 203 interpreted as a desire to overrule and the braking terminated in region b).

To this end, in FIG. 2 time t is plotted in the abscissa direction, and the degree of the activation of the gas pedal, labeled 201,
the intensity of a brake intervention of the safety function, labeled 202, and
a threshold value for the degree of the activation of the gas pedal, labeled 203, are plotted in the ordinate direction.

At time t1, an event, e.g. a collision or the detection of an imminent collision takes place, which leads to an activation of a safety system along with the implementation of a brake intervention. Simultaneously, duration $\Delta$ts of the startle reaction is ascertained. The exceeding of the threshold value by the degree of the activation of the gas pedal during time interval $\Delta$ts does not lead to a termination of the brake intervention. Only the renewed exceeding of the threshold value at time t2 deactivates the brake intervention.

Figure 1:
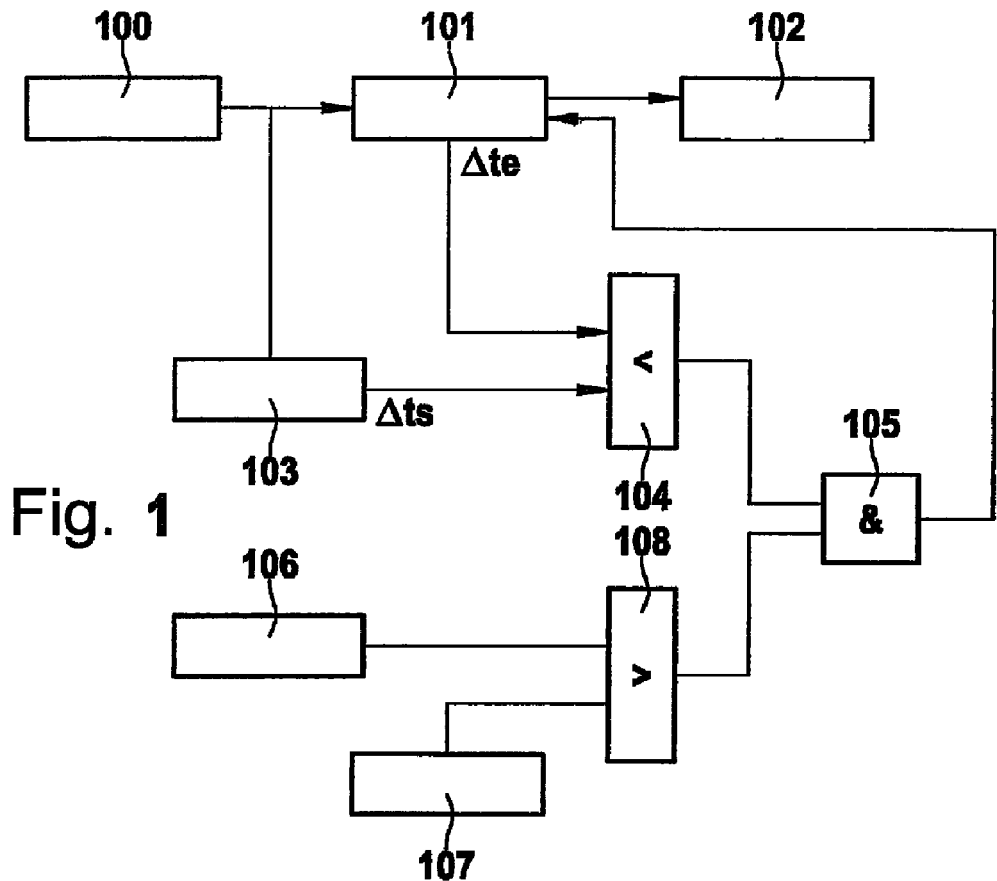
FIG. 1 shows a functional block diagram of the method according to an exemplary embodiment of the present invention.

FIG. 1 shows the method as a block diagram. A safety function 101, which implements interventions, for example, brake interventions, in a motor vehicle 102 is activated as a function of the output signals of sensors 100.

Duration $\Delta$ts of the startle reaction of the driver is ascertained in block 103. This may be assumed to be constant; however, it is also possible to select this as a function of the situation. For example, the duration of the startle reaction may be a function of the output signals of sensors 100.

Dead time or duration $\Delta$ts of the startle reaction is supplied to a comparison block 104, in which it is compared to intervention duration $\Delta$te. If $\Delta$ts<$\Delta$te, that is, the intervention, e.g. the brake intervention, is still in effect after duration $\Delta$ts of the startle reaction has elapsed, then a signal is given to intervention termination block 105. This signal means that the intervention may now be terminated by the driver, provided the driver expresses this desire.

The driver's desire is detected in block 106, for example, a gas pedal sensor detects an activation of the gas pedal by the driver.

What is claimed is:

1. A method for deactivating a safety function in a motor vehicle, the method comprising:
    after activation, deactivating the safety function by a driver only after a dead time has elapsed;
    wherein the safety function includes a driver-independent triggering of a braking operation after a collision has been detected.

2. The method according to claim 1, wherein a temporal length of the dead time is a function of a situation.

3. The method according to claim 1, wherein a temporal length of the dead time is a function of a variable that indicates an intensity of the detected collision.

4. The method according to claim 1, wherein at least one force acting on the driver is ascertained and a temporal length of the dead time is a function of the force that acts on the driver.

5. The method according to claim 1, wherein the safety function includes a driver-independent triggering of a braking operation after an imminent risk of a collision has been detected.

6. The method according to claim 5, wherein the imminent risk of a collision is detected on the basis of monitored environment-sensor-system signals.

7. The method according to claim 1, wherein a temporal length of the dead time is a function of a situation, wherein the safety function includes a driver-independent triggering of a braking operation after a collision has been detected, and wherein a temporal length of the dead time is a function of a variable that indicates an intensity of the detected collision.

8. The method according to claim 7, wherein at least one force acting on the driver is ascertained and a temporal length of the dead time is a function of the force that acts on the driver, wherein the safety function includes a driver-independent triggering of a braking operation after an imminent risk of a collision has been detected, and wherein the imminent risk of a collision is detected on the basis of monitored environment-sensor-system signals.

9. A device, comprising:
    an arrangement adapted to deactivate a safety function in a motor vehicle;
    wherein after activation, the safety function is deactivated by a driver only after a dead time has elapsed; and
    the safety function includes a driver-independent triggering of a braking operation after a collision has been detected.

10. The device according to claim 9, wherein a temporal length of the dead time is a function of a situation.

11. The device according to claim 9, wherein a temporal length of the dead time is a function of a variable that indicates an intensity of the detected collision.

12. The device according to claim 9, wherein at least one force acting on the driver is ascertained and a temporal length of the dead time is a function of the force that acts on the driver.

13. The device according to claim 9, wherein the safety function includes a driver-independent triggering of a braking operation after an imminent risk of a collision has been detected.

14. The device according to claim 13, wherein the imminent risk of a collision is detected on the basis of monitored environment-sensor-system signals.

15. The device according to claim 9, wherein a temporal length of the dead time is a function of a situation, wherein the safety function includes a driver-independent triggering of a braking operation after a collision has been detected, and wherein a temporal length of the dead time is a function of a variable that indicates an intensity of the detected collision.

16. The device according to claim 15, wherein at least one force acting on the driver is ascertained and a temporal length of the dead time is a function of the force that acts on the driver, wherein the safety function includes a driver-independent triggering of a braking operation after an imminent risk of a collision has been detected, and wherein the imminent risk of a collision is detected on the basis of monitored environment-sensor-system signals.

* * * * *